(12) United States Patent
Kato et al.

(10) Patent No.: US 7,853,939 B2
(45) Date of Patent: Dec. 14, 2010

(54) DEVICE-AWARE CONTENT DELIVERY

(75) Inventors: Saul Kato, San Francisco, CA (US); Anthony Haag, Redwood City, CA (US); Jason Watts, San Francisco, CA (US)

(73) Assignee: Qwikker, Inc., New York, NY (US)

( * ) Notice: Subject to any disclaimer, the term of this patent is extended or adjusted under 35 U.S.C. 154(b) by 0 days.

(21) Appl. No.: 11/534,133

(22) Filed: Sep. 21, 2006

(65) Prior Publication Data
US 2007/0130626 A1 Jun. 7, 2007

Related U.S. Application Data

(60) Provisional application No. 60/719,433, filed on Sep. 21, 2005.

(51) Int. Cl.
*G06F 9/45* (2006.01)
(52) U.S. Cl. .................................................. 717/158
(58) Field of Classification Search ......... 717/168–178, 717/158
See application file for complete search history.

(56) References Cited

U.S. PATENT DOCUMENTS

| | | | | |
|---|---|---|---|---|
| 6,448,986 | B1 * | 9/2002 | Smith | 715/801 |
| 6,771,749 | B1 * | 8/2004 | Bansal et al. | 379/88.17 |
| 7,249,344 | B1 * | 7/2007 | Zeanah et al. | 717/100 |
| 7,480,695 | B2 * | 1/2009 | Naick et al. | 709/206 |
| 2002/0160745 | A1 * | 10/2002 | Wang | 455/404 |
| 2002/0165988 | A1 * | 11/2002 | Khan et al. | 709/246 |
| 2003/0097639 | A1 * | 5/2003 | Niyogi et al. | 715/526 |
| 2003/0105719 | A1 * | 6/2003 | Berger et al. | 705/51 |

(Continued)

FOREIGN PATENT DOCUMENTS

| | | |
|---|---|---|
| WO | WO 2004/083989 A2 | 9/2004 |
| WO | WO 2004/105411 A1 | 12/2004 |

OTHER PUBLICATIONS

Griswold et al., A Component Architecture . . . , 2003, IEEE, p. 363-372.*
European Extended Search Report, European Application No. 06815286.7, Aug. 17, 2009, 7 pages.

*Primary Examiner*—John Chavis
(74) *Attorney, Agent, or Firm*—Patent Law Works LLP

(57) ABSTRACT

A system for device-aware content delivery includes a distributor and a database. The distributor includes modules for determining the type of portable computing device and delivering content that is operable on the specific type of portable computing device and uses the unique capabilities of the identified portable computing device. The database includes different profiles for different portable computing devices and gives information that allows those portable computing devices to be identified by type and distinguished from each other portable computing devices during a discovery or interrogation phase. The database also stores different versions of content adapted for operation on specific device types, such that once the device type has been identified, the matching content can be sent to the portable computing device, installed and executed. The matching content is programmatic action specific to the portable computing device. The present invention also includes a number of novel methods including: a method device-aware content delivery, a general method for automatically determining a device type, a method for determining device type using a Bluetooth® protocol and a method for determining a device type using an infrared device access protocol.

23 Claims, 9 Drawing Sheets

U.S. PATENT DOCUMENTS

| | | |
|---|---|---|
| 2003/0236917 A1 | 12/2003 | Gibbs et al. |
| 2004/0054803 A1* | 3/2004 | Ying et al. .................. 709/238 |
| 2004/0215757 A1* | 10/2004 | Butler ....................... 709/223 |
| 2005/0193054 A1* | 9/2005 | Wilson et al. ............... 709/200 |
| 2006/0015580 A1* | 1/2006 | Gabriel et al. .............. 709/219 |
| 2006/0142034 A1* | 6/2006 | Wentink et al. ............. 455/515 |
| 2006/0161685 A1* | 7/2006 | Chatterjee et al. ........... 709/246 |
| 2007/0149175 A1* | 6/2007 | Ying et al. ................ 455/412.1 |
| 2007/0254635 A1* | 11/2007 | Montelius ................ 455/414.1 |
| 2008/0090513 A1* | 4/2008 | Collins et al. .............. 455/3.01 |

\* cited by examiner

DEVICE-AWARE CONTENT DELIVERY

RELATED APPLICATIONS

The present application claims priority, under 35 U.S.C. §119(e), to U.S. Provisional Patent Application No. 60/719,433, filed on Sep. 21, 2005 and entitled "Intelligent Content Delivery And Management," which is herein incorporated by reference in its entirety.

BACKGROUND OF THE INVENTION

1. Field of the Invention

The present invention relates to information system networks and portable computing devices, and in particular, to a system and method for delivering content from a network to a portable computing device. Still more particularly, the present invention relates to a system and method for device-aware content delivery.

2. Description of the Background Art

The Internet and the World Wide Web have made great strides at bringing an incredible amount of information to the average home. Incredibly rich and detailed information about almost any part of the globe may reside merely a few keystrokes away from the typical computer user. Furthermore, new content such as movies and music are being delivered over these networks. But the typical computer user loses access to this rich pool of information once leaving home. Of course, the computer user could regain access to rich sources of information by reconnecting his computer to an electronic network after leaving home, but such connections are typically cumbersome and their availability is often limited.

There have been advances in the development of new data networks by large telecommunications companies. These new networks have a number of different types of access infrastructures and communication protocols. For example, Infrared, Bluetooth®, Ultra Wideband, RFID and WI-FI® are just a few of the new wireless communication mechanisms used to access these networks. In addition, each has different communications protocols and standards that may be used in conjunction with them. In addition to the increased number of data networks, there are also a myriad of new portable computing devices that each have different capabilities with regard to communication platform, communication protocol, computing power, display capabilities, etc. For example, there are simple cell phones with messaging capabilities; smart phone with increased capabilities, and Personal Digital Assistants (PDAs) with wireless communication capabilities. Within a particular device category, such as cellular phones, there are typically more than two hundred different models available in the market from a wide variety of manufacturers. Each of these devices typically has a different set of capabilities, features, and particular implementation of communications protocols, application interfaces, and operating systems.

In order to take some action dependent on the characteristics of a portable computing device, such as delivering content to the portable device that will be successfully and optimally matched to the characteristics of the device, there must be a mechanism to identify those device characteristics prior to or during data communications or other interactions with the device. This device identification may be a manual process such as user input on a website. However, this manual device identification may not be possible or may inhibit the use of a service due to user complexity of manual identification, lack of a convenient methodology for obtaining a manual selection, or constraints of time and place. For example, to transmit data from one computing device to another with the intention of executing, displaying, playing or otherwise successfully handling that data on the receiving device, the transmitting device must know both what communication protocols the receiving device supports, what kind of data the receiving device can handle, and what the operating system characteristics are prior to the transmission. Without such knowledge, the transmitted data may fail to be usable or interpretable by the device. If the transmitted data represents a software application to be subsequently executed on the device, without such knowledge, the application may fail to run or cause the device to crash.

While existing standards such as the Bluetooth® specification define standards for publishing supported communication protocols from one Bluetooth®-compliant device to another, they do not define a standard for publishing information that explicitly and uniquely identifies a device model, operating system, Central Processing Unit (CPU), or what types of data a device can receive and successfully handle. The device characteristics that Bluetooth® does make available to remote detection are very limited. Similarly, the Bluetooth® specification neither defines a standard nor requires that a Bluetooth®-compliant implementation publish information that explicitly identifies a device model, operating system, CPU or a list of supported data types. Furthermore, independent of standards, IrDA (Infrared Data Association) and Bluetooth® applications that ship pre-installed on mainstream computing devices often do not extend the minimal IrDA or Bluetooth® implementations to include access or publishing of the specific device characteristics mentioned above.

SUMMARY OF THE INVENTION

The present invention overcomes the deficiencies and limitations of the prior art by providing a system and method for device-aware content delivery. In one embodiment, the system includes a distributor and a database adapted for device-aware content delivery. The distributor includes modules for determining the type of portable computing device and delivering content that is operable on the specific type of portable computing device and uses the unique capabilities of the identified portable computing device. The database includes different profiles for different portable computing devices and gives information that allows those portable computing devices to be identified by type and distinguished from each other portable computing devices during a discovery or interrogation phase of communication. The database also stores different versions of content adapted for operation on specific device types, such that once the device type has been identified, the matching content can be sent to the portable computing device, installed and executed. The matching content is programmatic action specific to the portable computing device. The present invention also includes a number of novel methods including: a method for device-area content delivery, a general method for automatically determining a device type, a method for determining device type using a Bluetooth® protocol and a method for determining a device type using an infrared device access protocol.

BRIEF DESCRIPTION OF THE DRAWINGS

The invention is illustrated by way of example, and not by way of limitation in the figures of the accompanying drawings in which like reference numerals are used to refer to similar elements.

DETAILED DESCRIPTION OF THE PREFERRED EMBODIMENTS

A device-aware content delivery system and method are described. In the following description, for purposes of explanation, numerous specific details are set forth in order to provide a thorough understanding of the invention. It will be apparent, however, to one skilled in the art that the invention can be practiced without these specific details. In other instances, structures and devices are shown in block diagram form in order to avoid obscuring the invention. For example, the present invention is described primarily with reference to Bluetooth® and infrared communication protocols. However, the present invention applies to any type of communication protocols and could be used with other network and communication protocols.

Reference in the specification to "one embodiment" or "an embodiment" means that a particular feature, structure or characteristic described in connection with the embodiment is included in at least one embodiment of the invention. The appearances of the phrase "in one embodiment" in various places in the specification are not necessarily all referring to the same embodiment.

The algorithms and displays presented herein are not inherently related to any particular computer or other apparatus. Various general-purpose systems may be used with programs in accordance with the teachings herein, or it may prove convenient to construct more specialized apparatus to perform the required method steps. The required structure for a variety of these systems will be apparent from the description below. In addition, the present invention is not described with reference to any particular programming language. It will be appreciated that a variety of programming languages may be used to implement the teachings of the invention as described herein.

Moreover, the present invention claimed below may operate on or work in conjunction with an information system or network. For example, the invention can operate as a stand alone distributor or communicate with a network with additional functionality depending on the configuration. Thus, the present invention is capable of operating with any information system from those with minimal functionality to those providing all the functionality disclosed herein.

Distribution Network 100

Figure 1:
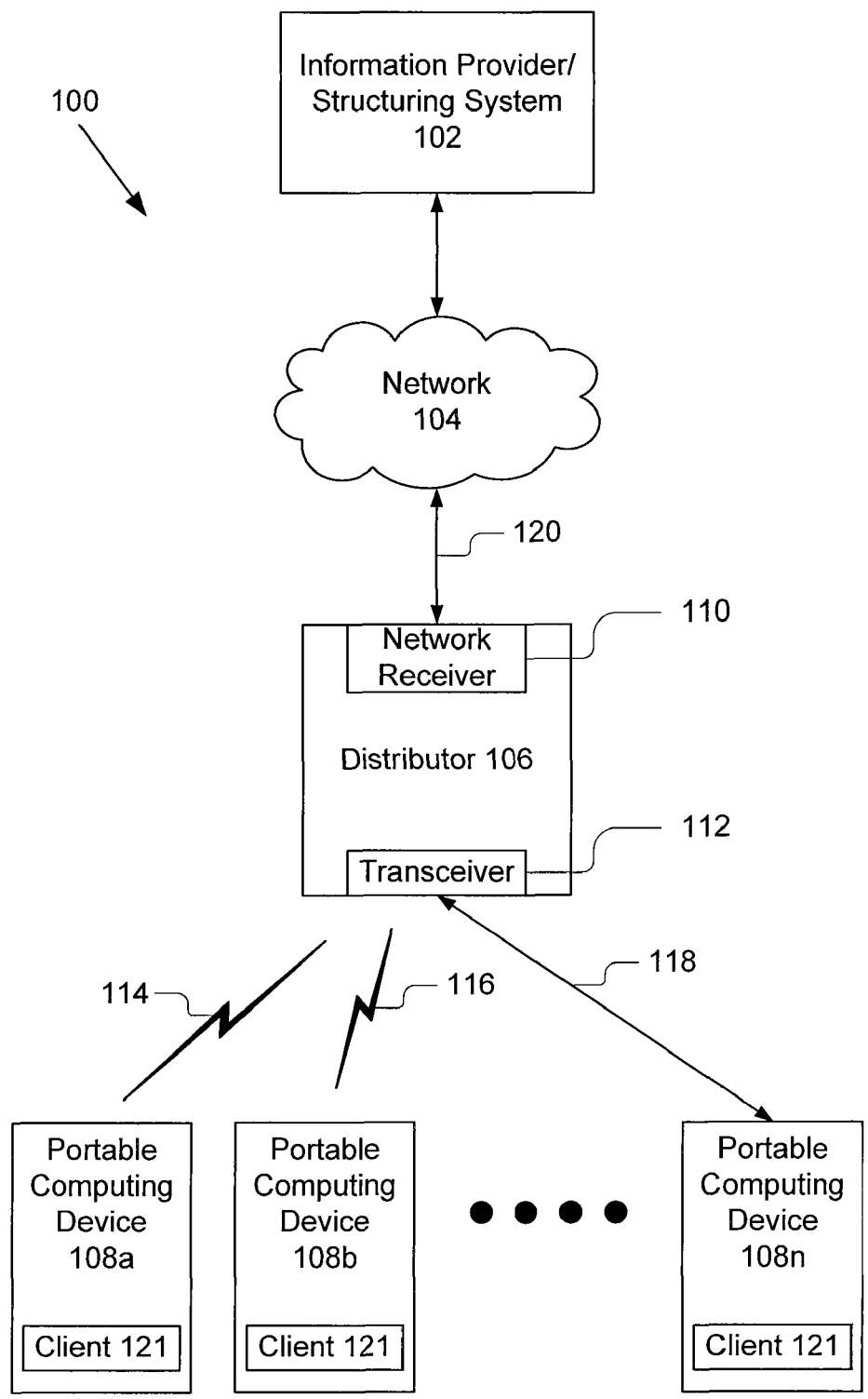
FIG. 1 illustrates an embodiment of a distribution network that allows information, such as software applications, provided by information provider systems to be downloaded to portable computing devices from distributors, according to an embodiment of the present invention.

FIG. 1 illustrates a distribution network 100 that allows information, such as software applications and/or related data, provided by information provider/structuring system 102 to be downloaded to portable computing devices 108a-n from distributors 106, according to an embodiment of the invention. The information provider system/structuring system 102 may include facilities for producing and/or uploading information suitable for ultimately downloading to the portable computing devices 108a-n.

The information provider system 102 may subsequently provide the information to a structuring system 102 over a network 104. In one embodiment, the functionality of the structuring system 102 is included in the information provider system 102. The network 104 may comprise any network suitable for transmitting information, such as the Internet, a local area network, the World Wide Web, etc. The structuring system 102 is configured to format the information (e.g., applications and data) into a format suitable for operation on the portable computing devices 108 and/or into a format suitable for transportation to the distributors 106. Accordingly, information providing system 102 (and personnel) associated with the information provider system 102 may require no skill or knowledge of the transportation mechanisms used to place the information on the portable computing devices 108.

The structuring system 102 provides the information, typically in the form of messages, to the various distributors 106 over a network 104. According to an embodiment of the invention, the network 104 may comprise a wireless network in which the information passes from a transmitter on the structuring system to a network receiver 110 on the distributor 106. In another embodiment of the invention, the network 104 comprises a paging network, and the transmitter sends the information to the distributors 106 in the form of paging messages. In yet another embodiment, the network 104 is a traditional packet switched network.

The distributors 106 may comprise wireless data caches that dispense localized information to portable computing devices 108, according to an embodiment of the invention. As wireless and battery-powered computing systems, the distributors 106 may be placed in a wide variety of environments and have their information routinely updated from the network 104, according to an embodiment of the invention. Embodiments of the distributors 106 may be placed in a small case of only a few square inches and operate unattended for several years.

The distributors 106 may include a network receiver 110 that receives information from the structuring system 102 via signal line 120. The distributors 106 may then format information received from the structuring system 102 for rebroadcast to the portable computing devices 108. A transceiver system 112 on the distributors 106 may broadcast information on demand to portable computing devices 108. Although only a single distributor 106 is shown in FIG. 1, those skilled in the art will recognize that there may be as many as necessary to provide coverage in a particular area. Additionally in an embodiment, multiple transceiver systems may be housed within one distributor to provider higher numbers of simultaneous device connections or to address several different communications protocols.

The transceiver system 112 may periodically transmit a beacon. A portable computing device 108 that receives the beacon through its transceiver and contains a specialized client 121 may return a first acknowledgement signal ("ACK") to the transceiver system 112. Receipt of the first ACK may prompt the distributor 106 to send the transceiver of the portable computing device 108 a broadcast that incorporates the information transmitted to the distributor 106 from the structuring system 102. The transceiver of the portable computing device 108 may acknowledge the broadcast by sending a second ACK. The transceiver 112 may be specifically designed to send the beacon and the broadcast to the portable computing devices 108 at distances in excess of the conventional communication range for the transceiver of the portable computing device 108, according to an embodiment of the invention. In addition, the transceiver 112 may receive the first ACK and the second ACK at distances in excess of the conventional communication range for the transceiver of the portable computing device 108, according to an embodiment of the invention.

The portable computing devices 108a-n typically require no additional hardware in order to receive information broadcasts, including extended range broadcasts, from the distributor 106, according to an embodiment of the invention. However, the portable computing devices 108 must typically include the client 121. The portable computing devices 108 may obtain the client 121 in a variety of ways, including from the distributor 106 using the device-aware content delivery methods of the present invention. In particular, the distributor 106 may direct the transceiver system 112 to periodically transmit a beam interrogation to identify the presence of a portable computing device 108 that is ready to download the client 121. A portable computing device 108 that receives the beam interrogation through its transceiver may return a beam response to the transceiver system 112. Receipt of the beam response may prompt the distributor 106 to provide a download signal that downloads the client 121 into the portable computing device 108. Of course, the beam interrogation, the beam response, and the download signal generally may be within a conventional communication range for the transceiver of the portable computing device 108, according to an embodiment of the invention. As shown in FIG. 1, different portable computing devices 108a-n may be adapted for communication with the distributor 106 in various different ways. For example, portable computing device 108a is coupled by a wireless infrared connection 114 to the distributor 106, while portable computing device 108b is coupled by a Bluetooth® wireless connection 116 to the distributor 106. Furthermore, portable computing device 108n is coupled by a physical signal line 118 such as an Ethernet or USB to the distributor 106.

The information provider system 102, the structuring system 102, the distributors 106, and the portable computing devices 108 may comprise various forms of computing equipment. In some instances, the information provider system 102 and the structuring system 102 may even comprise multiple computing systems. The computing systems used in the distribution network 100 may comprise conventional computer designs, according to an embodiment of the invention.

Distributor 106

Figure 2:
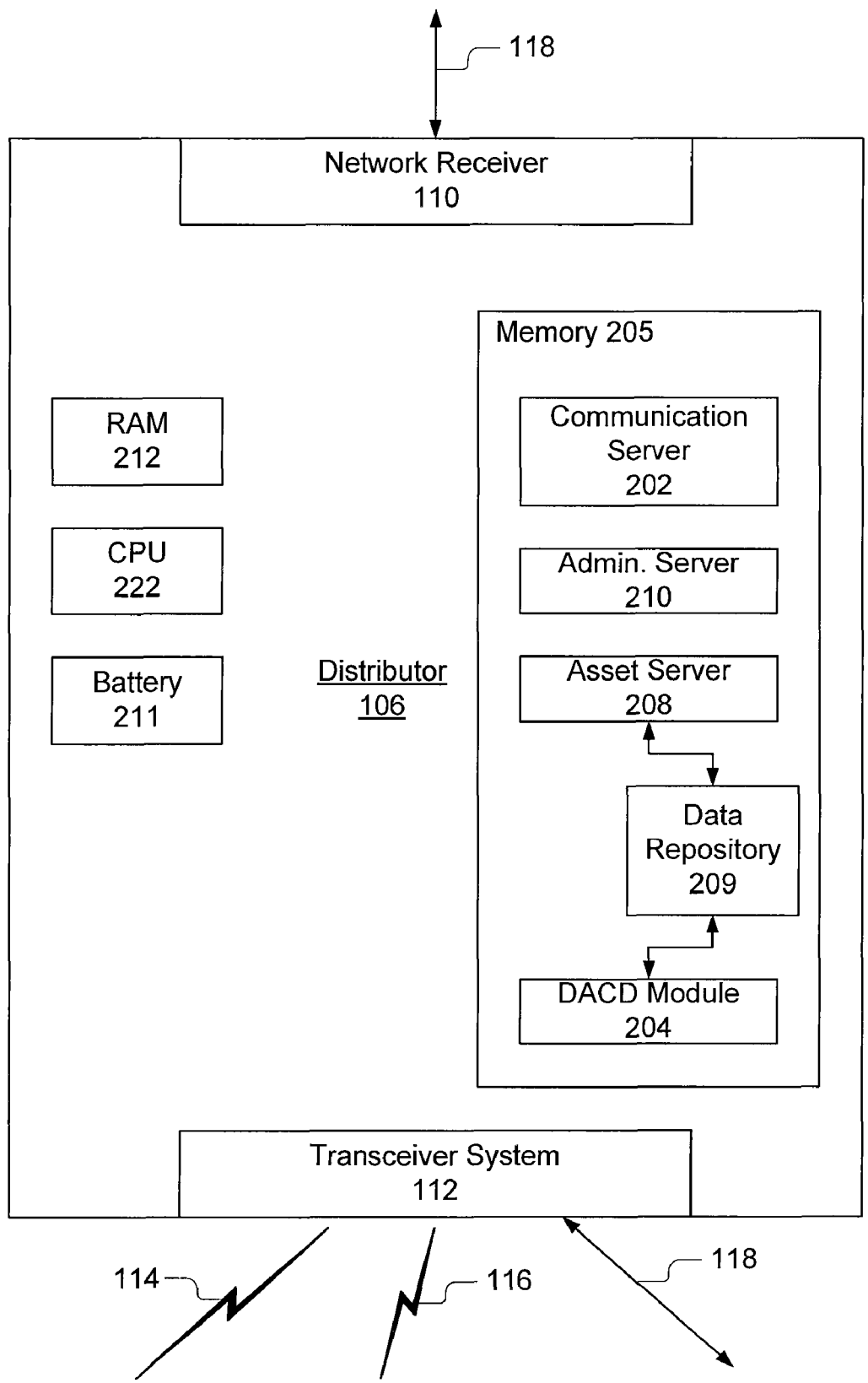
FIG. 2 illustrates a distributor according to an embodiment of the present invention.

FIG. 2 illustrates the distributor 106, according to an embodiment of the invention. The distributor 106 may also be viewed as a "local data cache," in that the distributor 106 may dispense information to the portable computing devices 108a-n that relates to a location where the distributor 106 has been installed. Of course, the distributor 106 may also dispense information having no particular association with a given location. However, providing location-related information to portable computing devices 108a-n may enhance the portable computing device user's experiences at the local site and/or provide a source of immediate and valuable information. As previously mentioned, embodiments of the distributor 106 may comprise small, wireless, battery-powered devices. If the distributor 106 itself comprises a portable computing device, the system 100 can used as a peer-to-peer device-aware content delivery system.

In order to take advantage of the information received from the distributor 106, the portable computing devices 108a-n typically need to receive and install the specialized client 121 configured to receive broadcasts from the distributor 106 and process them on the portable computing device 108. The distributor 106 may also include reprogramming support so that the distributor 106 itself may receive new programs and/or updates for existing programs, according to an embodiment of the invention. According to some embodiments of the invention, the distributor 106 may receive new programs and/or updates for existing programs from the structuring system 102 via the network 104. Likewise, the distributor 106 may receive a new client 121 or an update for an existing client 121 via the network 104, according to an embodiment of the invention. The new client 121 or update for the existing client 121 may be downloaded to the portable computing devices 108a-n.

In an embodiment of the invention, the distributor 106 may collect information (e.g., applications and/or data) from the network 104 (e.g., a wireless wide area network) and redistribute the information to nearby portable computing devices 108a-n (e.g., distribution within a wireless "pico cell"). The distributor 106 may use a one-way paging network for information reception and a short range two-way infrared ("IR") communication mechanism to distribute the information locally to portable computing devices 108, according to an embodiment of the invention. Hence, embodiments of the distributor 106 may receive and process paging communications and generate IR communications for information broadcasts 118 to the portable computing devices 108. According to some embodiments of the invention, the distributor 106 may use a one-way communication mechanism (e.g., a one-way IR communication mechanism) to distribute information locally to portable computing devices 108a-n. In particular, the distributor 106 may repeatedly send broadcasts for a given time interval(s) of a given day(s), according to an embodiment of the invention. According to an embodiment of the invention, the distributor 106 need not be prompted by a portable computing device 108 in order to repeatedly send broadcasts. According to some embodiments of the invention, the distributor 106 may offer portable computing devices 108 more than one piece of information for downloading. In such embodiments, the distributor 106 may offer (e.g., download) a menu of its available selections for which a user associated with a portable computing device 108 may make a selection which is returned to the distributor 106 using a protocol procedure described herein.

The distributor 106 may operate without user intervention and may typically require no special configuration or maintenance concerns. Embodiments of the distributor 106 may also operate without any connections such as to an external power source or wiring.

The distributor 106 may comprise a network receiver 110, a memory 205, a random access memory ("RAM") 212, a CPU 222, a battery 211, and a transceiver system 112, according to an embodiment of the invention. According to some embodiments of the invention, the memory 205 may include a nonvolatile memory. According to some embodiments of the invention, the memory 205 may include a volatile memory and/or a combination of a volatile memory and a nonvolatile memory. The memory 205 may provide storage for the various programs accessed and run by the CPU 222. These programs may include a communication server 202, an asset server 208, an administration server 210, and an DACD module 204. The communication server 202 may process messages received by the network receiver 110 from the network 104 and forward the processed messages to the asset server 208. The asset server 208 may identify information incorporated in the processed messages that is to be downloaded to the portable computing devices 108a-n. The asset server 208 may retain information to be downloaded in a data repository 209. The data repository may include files and a database. The administration server 210 may direct the operations of the distributor 106 and supervise maintenance tasks performed on the distributor 106. The DACD module 204 performs the operations described below with reference to FIGS. 4-8 for the device-aware content delivery of the present invention. The DACD module 204 is adapted for communication with the data repository for storage of content for specific remote devices, and for the storage of profiles that can be used with interrogation to determine the type and capabilities of a particular portable computing device 108. The DACD module may be embodied as a software application running on the CPU 222.

The distributor 106 may include the transceiver system 112 as a means of communicating with portable computing devices 108, according to an embodiment of the invention. The transceiver system 112 may comprise a line-of-sight communication device, such as an infrared transceiver, according to an embodiment of the invention. The transceiver system 112 may, alternatively or in conjunction, comprise a short-range or medium-range radio frequency communication device, such as a Bluetooth® enabled device, according to an embodiment of the invention. An ordinary artisan will recognize that combinations of receiver(s) and transmitter(s) may be used in place of, or in conjunction with, transceiver(s) in the transceiver system 112.

The distributor 106 may provide increased power for the transceiver system 112 as a means for increasing the range of its transmissions and/or the range from which it can receive transmissions from the portable computing devices 108, according to an embodiment of the invention. In some embodiments, the transceiver system 112 may transmit and receive signals at distances considerably in excess of the conventional transmission distances of many portable computing devices 108 (e.g., 10 to 30 feet versus 3 feet for Palm Pilots).

The transceiver system 112 may be configured to generate a beacon, a broadcast, a beam interrogation, a device inquiry, and a download signal and send these signals to one or more portable computing devices 108, according to an embodiment of the invention. The transceiver system 112 may receive acknowledgement signals ("ACK") and a beam response from the portable computing devices 108a-n, according to an embodiment of the invention. The roles of these signals will be discussed further herein.

While the transceiver system 112 may be made to operate as a RF-based system, an overall goal of an embodiment of the distribution network 100 is interoperability with pre-existing portable computing devices 108. Since more than a billion portable computing devices 108 already include an infrared ("IR") or Bluetooth® capability, many embodiments of the distributor 106 may support IR communications, at least until other communications systems become more popular. Thus, as will be discussed, the transceiver system 112 may be enabled for receipt of digital and/or analog transmissions and may also be enabled to receive point-to-point and/or multicast transmissions, according to various embodiments of the invention.

The distributor 106 may include a network receiver 110. For example, the network receiver 110 may receive transmissions from the structuring system 102 via the network 104. Once the distributor 106 has received and processed a transmission, the distributor 106 may then broadcast the transmissions to a plurality of portable computing devices 108a-n (e.g., broadcast in accordance with the protocol described herein). Thus, the network receiver 110 receives transmissions into the distributor 106 for later transmission out of the distributor 106 by the transceiver system 112. As will be discussed, embodiments of the invention receive transmissions into the distributor 106 according to a first communication protocol and broadcast information to the portable computing devices 108 according to a second communication protocol.

The network receiver 110 may comprise a communication device configured for receiving paging transmissions according to a one-way protocol, according to an embodiment of the invention. A suitable one-way protocol is Motorola's Flex protocol, which may be deployed in an embodiment of the invention. In another embodiment, the receiver 110 may communicate using a General Packet Radio Service (GPRS). The network receiver 110 may, alternatively or in conjunction, be configured for reception of radio frequency broadcasts from another radio frequency network, according to an embodiment of the invention.

The communication server 202 may direct operations of the network receiver 110 and provide an interface between the distributor 106 and the network 104. Embodiments of the communication server 202 may support wireless communications. The communication server 202 may manage message formatting and communication protocol tasks needed for communicating with the network 104. The communication server 202 may also provide message queuing and local message storage of information received over the network 104. Alternatively or in conjunction, the communication server 202 may deliver information to the asset server 208, which may conduct the queuing and storage operations in the data repository 209, according to embodiments of the invention.

The network 104 facilitates communications between the structuring system 102 and the distributors 106 in the distribution network 100. Thus, the network 104 may be used to transfer information from the structuring system 102 to individual distributors 106. The network 104 may use a wireless communication system. According to an embodiment of the invention, the network 104 may comprise a paging network. For example, the system communication network 104 may comprise a one-way paging network, such as the Flex paging network offered by Motorola®.

The network 104 may not necessarily be configured for rapid information transmissions, according to an embodiment of the invention. For example, embodiments of the Flex paging network, which may be used to provide the network 104, typically transmits information at a relatively slow 1600 bps. In addition, the network 104 may be shared with transmissions unrelated to the distributors 106. For example, the Flex paging network may comprise page transmissions to any sort of paging device in an urban environment. Accordingly, to account for limits in the amount of information that may be transmitted to the distributors 106 at a given instance, operators of the structuring system 102 may send transmissions to the distributors 106 during moments of relatively low traffic, such as at night. In addition, the operators associated with the structuring system 102 may monitor available bandwidth on the network 104 and send transmissions to the distributors 106 as periods of higher bandwidth arise. Such transmissions may even include sending partial messages to the distributors 106. In such instances, the distributor 106 may reassemble a complete transmission from various messages that it has received.

A protocol that may be used for transmissions between the structuring system 102 and various distributors 106 is described herein, according to an embodiment of the invention.

The distribution network 100 may comprise a plurality of distributors 106. Each distributor 106 may include a transceiver system 112 as a means of communicating with portable computing devices 108*a-n*, according to an embodiment of the invention. The transceiver system 112 may comprise a line-of-sight communication device, such as an infrared ("IR") transceiver, according to an embodiment of the invention. The transceiver system 112 may, alternatively or in conjunction, comprise a short-range or medium-range radio frequency communication device, such as a Bluetooth® enabled device, according to an alternative embodiment.

The transceiver system 112 may comprise an IR transceiver and an IR receiver, according to an embodiment of the invention. The IR transceiver may include an IR transmitter/receiver pair. The IR transceiver may conduct IrDA communications (e.g., for downloading the client 121), according to an embodiment of the invention. In addition, the IR transceiver may conduct transmissions associated with transfer of information to the portable computing devices 108*a-n* (e.g., sending beacons and broadcasts). According to an embodiment of the invention, an output power of the IR transceiver may be increased to increase transmission range of the beacons and broadcasts. The IR receiver may provide additional reception range and sensitivity for transmissions sent to the distributor 106 from the portable computing devices 108*a-n*. In another embodiment, the transceiver system 112 further includes a high power IR transmitter that may provide additional transmission range for transmissions sent from the distributor 106 to various portable computing devices 108*a-n*. The high power IR transmitter may, in conjunction with the IR transceiver, provide the beacons and broadcasts. According to another embodiment of the invention, the high power IR transmitter may provide the beacons and broadcasts, and the IR transceiver may conduct IrDA communications (e.g., for downloading the client 121).

The transceiver system 112 may be designed to compensate for sources of interference, such as sunlight and noise produced by other portable computing devices 108*a-n*. Additionally, operation of the distributor 106 may require that the function of the transceiver system 112 (e.g., its IR port) be obvious and conspicuous. Accordingly, the transceiver system 112 may include an IR window that facilitates transmissions out of and into the transceiver system 112. The IR window may act as a filter that reduces distortion and/or noise. The distributor 106 may include multiple LEDs as a means for widening the beam projected by the transceiver system 112, according to an embodiment of the invention.

According to some embodiments of the invention, the receiver may operate in conjunction with a filter that enhances the receiver's ability to receive signals within a particular frequency range or within one or more frequency ranges, according to an embodiment of the invention. The filter may be of conventional design, provided that it keeps the receiver tuned to a particular frequency range or particular frequency ranges, according to an embodiment of the invention. For example, the filter may comprise a bandpass filter that has been tuned for increased receiver sensitivity at the particular frequency or range of frequencies of the ACKs in order to increase the reception range for the ACKs in the distributor 106. The receiver may be tuned to a frequency, such as 38 kHz or 37.5 kHz, to provide optimal performance, according to an embodiment of the invention.

The transceiver system 112 may provide three general types of signals, according to an embodiment of the invention. These signals include a beacon, a broadcast, and signals associated with downloading the client 121 (e.g., the beam interrogation and the download signal for the client 121). The transceiver system 112 may provide the beacon in closely spaced intervals (e.g., two-second intervals) as a mechanism for discovering portable computing devices 108. The transceiver system 112 may be configured to send the broadcast several times to the portable computing devices 108*a-n* in order to make sure that a client (e.g., the client 121 shown in FIG. 1) properly receives the broadcast, according to an embodiment of the invention. The various signals provided by the transceiver system 112 may include IR signals centered on a wavelength of 880 nm, according to an embodiment of the invention.

The transceiver system 112 may generate IR signals for the beam interrogation, the download signal, the beacon, and/or the broadcast according to a first modulation scheme and detect IR signals for the ACKs from the portable computing devices 108 that are generated according to a second modulation scheme, according to an embodiment of the invention. For instance, the first modulation scheme may be an IrDA-type modulation scheme, and the second modulation scheme may be similar to the modulation schemes used by television remotes, according to an embodiment of the invention.

The distributor 106 may support a 115.2 kbps information transfer rate to portable computing devices 108, according to an embodiment of the invention. To support a timely information transfer, the amount of information transmitted from the distributor 106 to a portable computing device 108 may last just a few seconds (e.g., 5 seconds) per transfer, according to an embodiment of the invention. An optimal end user experience may occur when the broadcast is repeated with no more than a few seconds (e.g., 5 seconds) of latency from the last transmission or when the broadcast occurs within a few seconds (e.g., 5 seconds) of a request to transmit, according to an embodiment of the invention.

The portable computing devices 108 may send the ACKs to the transceiver system 112. The portable computing devices 108 may transmit the ACKs in a modulated manner that resembles the way in which a television remote control device communicates with a television, according to an embodiment of the invention. The ACKs typically comprise a fairly short, fixed length transmission. The ACKs may include information regarding the state of the portable computing device 108, its serial number, its model number, and/or various other status and identification information, according to an embodiment of the invention. In an alternative embodiment of the invention, the portable computing devices 108 may send larger transmissions to the distributors 106 than provided by the ACKs, or rather, the length of the ACKs may be increased to provide additional information. For instance, such additional information may include a request for given information stored in the memory 205 of the distributor 106.

In another embodiment, the transceiver system 112 may comprise an IR transceiver unit and a RF transceiver unit, according to other embodiments of the invention. The IR transceiver unit may comprise the IR transceiver and the IR receiver as discussed above.

According to another embodiment of the invention, the IR transceiver unit may comprise the IR transceiver, the high power IR transmitter, and the IR receiver as discussed above. The RF transceiver unit may comprise a short range or medium-range radio frequency communication device, such as a Bluetooth® enabled transceiver or a Bluetooth® enabled transmitter/receiver pair. A distributor 106 comprising the transceiver system 112 may be configured to communicate with a portable computing device 108 using an IR wireless communication protocol and/or a RF wireless communication protocol. The portable computing device 108 may include a client (e.g., the client 121 shown in FIG. 1) that facilitates communications with the distributor 106 using the protocol described herein. The distributor 106 (or another distributor 106 of the distribution network 100) may provide the client 121 wirelessly to the portable computing devices 108. The distributor 106 is typically configured to provide the client 121 to portable computing devices 108 upon request, according to an embodiment of the invention. Portable computing devices 108*a-n* that have not yet received the client 121 must typically be within a conventional communications distance from the distributor 106 in order to receive the client 121. For example, a conventional Palm Pilot must typically be within a three feet or less of the distributor 106 in order to receive the client 121 via the transceiver system 112. Downloading the client 121 may require the use of a conventional IR communication protocol (e.g., IrDA) and "beaming" applications which many portable computing devices 108 already support. Thus, the distributor's communication software may use the conventional IrDA Object Exchange ("OBEX") protocol layer (and associated lower level IrDA protocol layers) to distribute the client 121. In some embodiments, the client 121 may be constrained to a size that allows the IrDA transfer to occur within a few seconds (e.g., 8 seconds). Alternatively or in conjunction, the client 121 may be provided to the portable computing device 108 using an RF communication protocol (e.g., Bluetooth®). The client 121 may also be provided to the portable computing devices 108 in a variety of mechanisms other than, or in addition to, downloading from the distributor 106, according to an embodiment of the invention. Procedures for downloading the client 121 to the portable computing devices 108 may include factory installation of the client 121, downloading over an electronic network (such as the World Wide Web), and providing the client 121 in conjunction with the installation of other software. In addition, it should be recognized that a portable computing device 108 that includes a first version of the client 121 may download a second version (or updated version) of the client 121 from the distributor 106 via a broadcast, according to an embodiment of the invention.

Portable Computing Device 108

Figure 3:
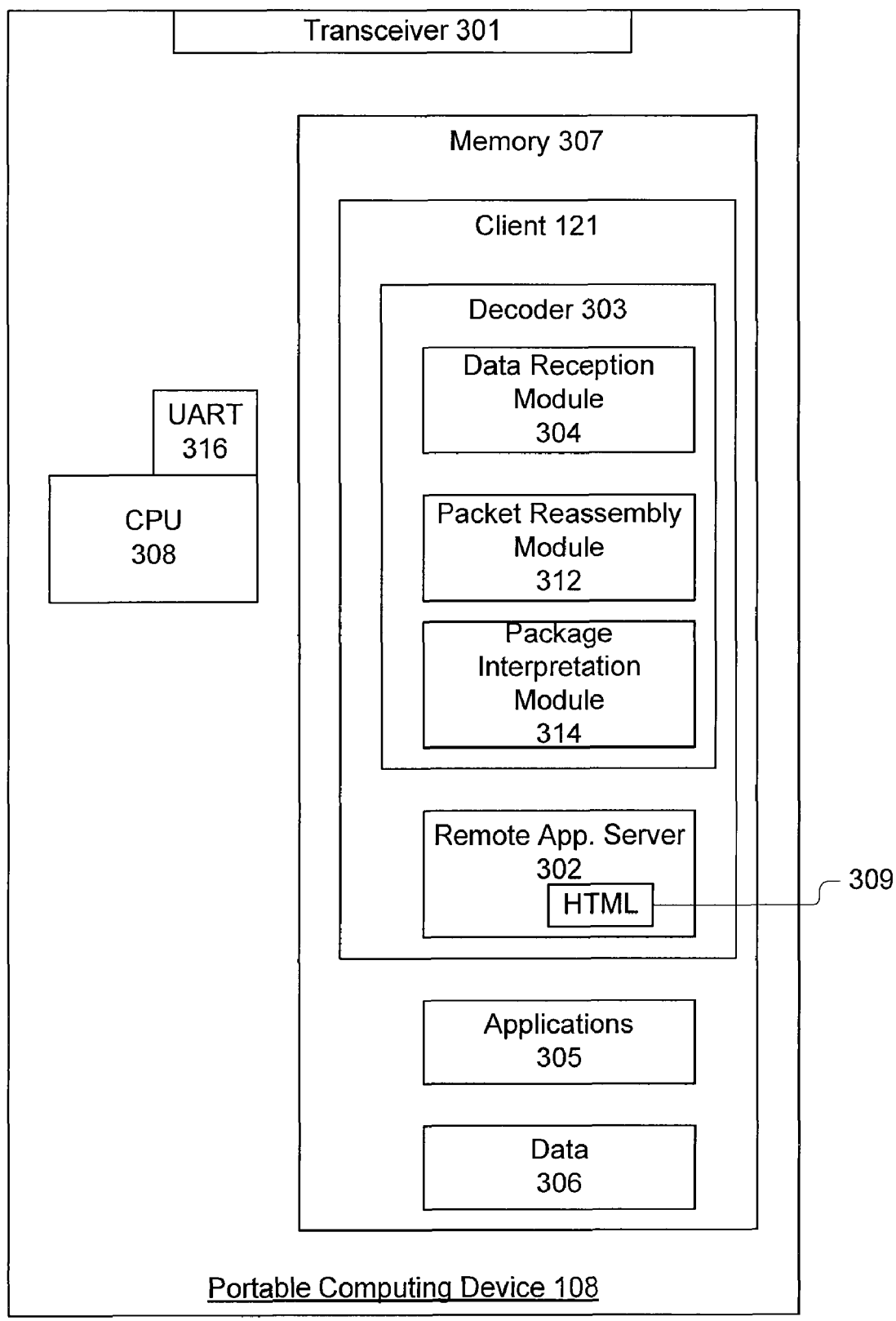
FIG. 3 illustrates an embodiment of a portable computing device having a client configured for communications with a distributor, according to an embodiment of the invention.

FIG. 3 illustrates an embodiment of a portable computing device 108*a-n* having the client 121 configured for communications with the distributor 106, according to an embodiment of the invention. The client 121 assists the pre-existing hardware and software on the portable computing device 108 in communicating with the distributor 106. The portable computing device 108 may require no physical modifications in order to communicate with the distributor 106 once the portable computing device 108 has been equipped with the client 121.

A typical portable computing device 108 may include the transceiver 301, a CPU 308, and a memory 307. According to some embodiments of the invention, the memory 307 may include a nonvolatile memory. According to some embodiments of the invention, the memory 307 may include a volatile memory and/or a combination of a volatile memory and a nonvolatile memory. Of course, the portable computing device 108 may also include other hardware (e.g., a RAM) and software elements. The transceiver 301 is typically configured for wireless communications according to a known wireless communication protocol (e.g., IrDA communication protocol, or Bluetooth® protocol). An ordinary artisan will understand that the transceiver 301 may be replaced with a transmitter and a receiver such that the portable computing device's communications will continue to operate in a similar manner. Programs retained in the memory 307 may be processed by the CPU 308.

The client 121 typically comprises a decoder 303 and a remote application server ("RAS") 302, according to an embodiment of the invention. Applications 305 and data 306 typically comprise information received from the distributor 106 via a broadcast. The RAS 302 typically executes the applications 305 using the data 306 upon receiving a program execution instruction (such as may be provided by a user of the portable computing device 108), according to an embodiment of the invention. The complete client 121 may be fairly lightweight and around 100K in size, according to an embodiment of the invention.

While the portable computing device 108 may be any portable computing device, for at least one embodiment of the invention, the portable computing device 108 is a Palm Pilot, and the distribution network 100 has been designed to operate in conjunction with the Palm operating system ("Palm OS"). So in this embodiment, the distributor 106 is designed to provide the client 121 for operation on, or in conjunction with, a Palm operating system.

The distributor 106 may include functionality for determining what kind of an operating system resides on a given portable computing device 108, according to embodiments of the invention. The distributor 106 may read the portable computing device's signature and then respond with an IrDA query, e.g., "What are you?" According to some embodiments of the invention, a distributor 106 determines the operating system of a given portable computing device 108 from information incorporated in a beam response. Having determined the particular operating system, the distributor 106 may select a client 121 appropriate for the operating system and download the client 121 to the portable computing device 108. Another portable computing device identification method may comprise developing the client 121 to operate on a preferred platform, such as a Palm proprietary system, and then providing some other functionality for bootstrapping the Palm implementation into other systems. Available operating systems may include the Palm operating system, pocket PC, and WinCE.

The decoder 303 may comprise components, such as (1) a data reception module 304; (2) a packet re-assembly module 312; (3) and a package interpretation module 314 that interprets the overall package received. Like many other elements of the distribution network 100, embodiments of the decoder 303 may comprise software or circuitry, as well as hybrids comprising both software and circuitry. The decoder 303 directs operations of the transceiver 301 in communicating with the distributor 106.

The data reception module 304 may be configured to understand the data transfer communication protocol(s) used by the distributor 106 in broadcasting information to the portable computing device 108. Operations of the data reception module 304 with respect to data transfer communication protocol(s) will be described further herein. The data reception module 304 may look for dropped packets and may wait for a re-broadcast in order to attain any dropped packets.

According to some embodiments of the invention, the data reception module 304 may configure hardware and/or software of the portable computing device 108 to generate a signal with particular physical characteristic(s), such as, for example, with a particular encoding scheme, a particular modulation scheme, and/or a particular information transmission rate. According to some embodiments of the invention, the data reception module 304 configures the portable computing device 108 to generate the ACK with physical characteristic(s) that enable the transceiver system 112 of the distributor 106 to receive the ACK at a greater distance from the portable computing device 108. The physical characteristic(s) of the ACK may differ from physical characteristic(s) of a signal generated in accordance with a conventional communication protocol (e.g., IrDA). According to some embodiments of the invention, the data reception module 304 may configure the portable computing device 108 to generate an ACK with physical characteristic(s) similar to that used in conventional IR remote controls, such as, for example, a conventional television remote control. In particular, some embodiments of the data reception module 304 may direct the transceiver 301 to transmit an ACK at a transmission rate of 1200 bps using a non-return-to-zero ("NRZ") encoding scheme with a 37.5 kilohertz ("kHz") amplitude-shift-keying ("ASK") modulation scheme, wherein a 37.5 kHz IR tone is generated for a binary "0," and an IR tone is not sent for a binary "1."

As shown in FIG. 3, embodiments of the portable computing device 108 may include a Universal Asynchronous Receiver/Transmitter ("UART") 316. The UART 316 may be incorporated in the CPU 308 or may be configured as a separate device. According to some embodiments, the data reception module 304 may configure the portable computing device 108 to transmit a non-IrDA type ACK by configuring the UART 316 and controlling the CPU's UART TXD pin (not shown) directly. As one of ordinary skill in the art will understand, the UART TXD pin in a conventional portable computing device 108 (e.g., a Palm Pilot) may be configured as a general purpose I/O pin or as an UART pin. According to one embodiment of the invention, the UART baud rate is configured to 75,000 bps, and the UART's mode is changed from IrDA to NRZ (and the UART TXD pin polarity set appropriately). According to this embodiment of the invention, NRZ is used because a resulting IR pulse shape is more appropriate for the 37.5 kHz ASK modulation. In this embodiment, to transmit a binary "0" (with a 37.5 kHz IR tone), the UART 316 repeatedly sends a character 0x55 to the transceiver 301 for the duration of a 1200 bps bit time. At 75,000 bps, the character 0x55 will produce a 37.5 kHz IR tone. In this embodiment, to transmit a binary "1" (no IR tone), the UART 316 still transmits characters (for timing purposes), but the UART TXD pin is configured as a general purpose I/O and is forced low (or high depending on the detected hardware polarity) to force the transceiver 301 off. It should be recognized that other combinations of characters sent to the transceiver 301 and UART baud rate may be selected to generate a 37.5 kHz IR tone, according to some embodiments of the invention. For example, according to one embodiment of the invention, a 37.5 kHz IR tone is generated by configuring the UART baud rate to 150,000 bps and configuring the UART 316 to repeatedly send a character 0x33 to the transceiver 301 for the duration of the ACK bit time (e.g., the duration of a 1200 bps bit time). Likewise, various combinations of characters sent to the transceiver 301 and UART baud rate may be selected to generate IR tones of different frequencies (e.g., frequencies different from 37.5 kHz).

It should be recognized that the data reception module 304 may configure the portable computing device 108 to generate an ACK having various physical characteristic(s) (e.g., characteristic(s) that allow for an increased transmission range of the ACK). Embodiments of the data reception module 304 may direct a portable computing device 108 to generate signals with various physical characteristic(s) by controlling one or more of the following: (1) UART baud rate; (2) UART mode (e.g., IrDA or NRZ); (3) UART TXD pin; (4) character(s) sent by the UART 316 to the transceiver 301; and (5) duration for which a given character is sent by the UART 316 to the transceiver 301. For instance, one embodiment of the data reception module 304 may configure the portable computing device 108 to generate an ACK using a frequency-shift-keying ("FSK") modulation scheme. In this embodiment, the UART 316 may repeatedly send a character (e.g., 0x55) to the transceiver 301, and the UART baud rate may be varied for consecutive ACK bit times.

The packet re-assembly module 312 may reassemble the packets received according to the data transfer communication protocol and place them into a meaningful data stream that can then be passed to other portions of the client 121 and beyond. In an embodiment of the invention, the distributor's data transfer communication protocol may operate with a single broadcast payload per distribution with a plurality of packets. The packet re-assembly module 312 may reassemble packets that are received out of order, even when received across multiple broadcasts from the distributor 106. The number of packets received may be determined by a size of the overall broadcast payload, according to an embodiment of the invention.

Once a complete broadcast has been received, the decoder 303 may perform error correction before making the resulting information (e.g., an application 305 and/or data 306) available to the remote application server ("RAS") 302. The distribution network 100 may use error correcting codes in the manner known to ordinary artisans in the relevant field.

According to some embodiments of the invention, information received via a broadcast may comprise one or more of the following: a data repository, a logic portion, and formatting information. The data repository may include data (e.g., organized in the form of a Structured Query Language ("SQL") table) that may be accessed by the RAS 302 to generate content at the portable computing device 108. The logic portion may include instructions that specify action(s) or processing to be undertaken in response to a user input. In particular, the logic portion includes instructions that may be executed by the RAS 302 to produce a search query of the data repository in accordance with a user input, according to an embodiment of the invention. The formatting information may specify presentation and/or layout of the content generated by the RAS 302, which content may be displayed to a user of the portable computing device 108. According to an embodiment of the invention, information downloaded by a portable computing device 108 may comprise a HTML file 309 that includes an embedded programming code (e.g., a Java-based scripting language code, a JavaScript code, or a Visual Basic Script code). In this embodiment, the formatting information may comprise HTML tags in the HTML file, and the logic portion may comprise the embedded programming code. According to an embodiment of the invention, the logic portion may comprise one or more SQL queries corresponding to one or more user inputs.

Methods

Figure 4:
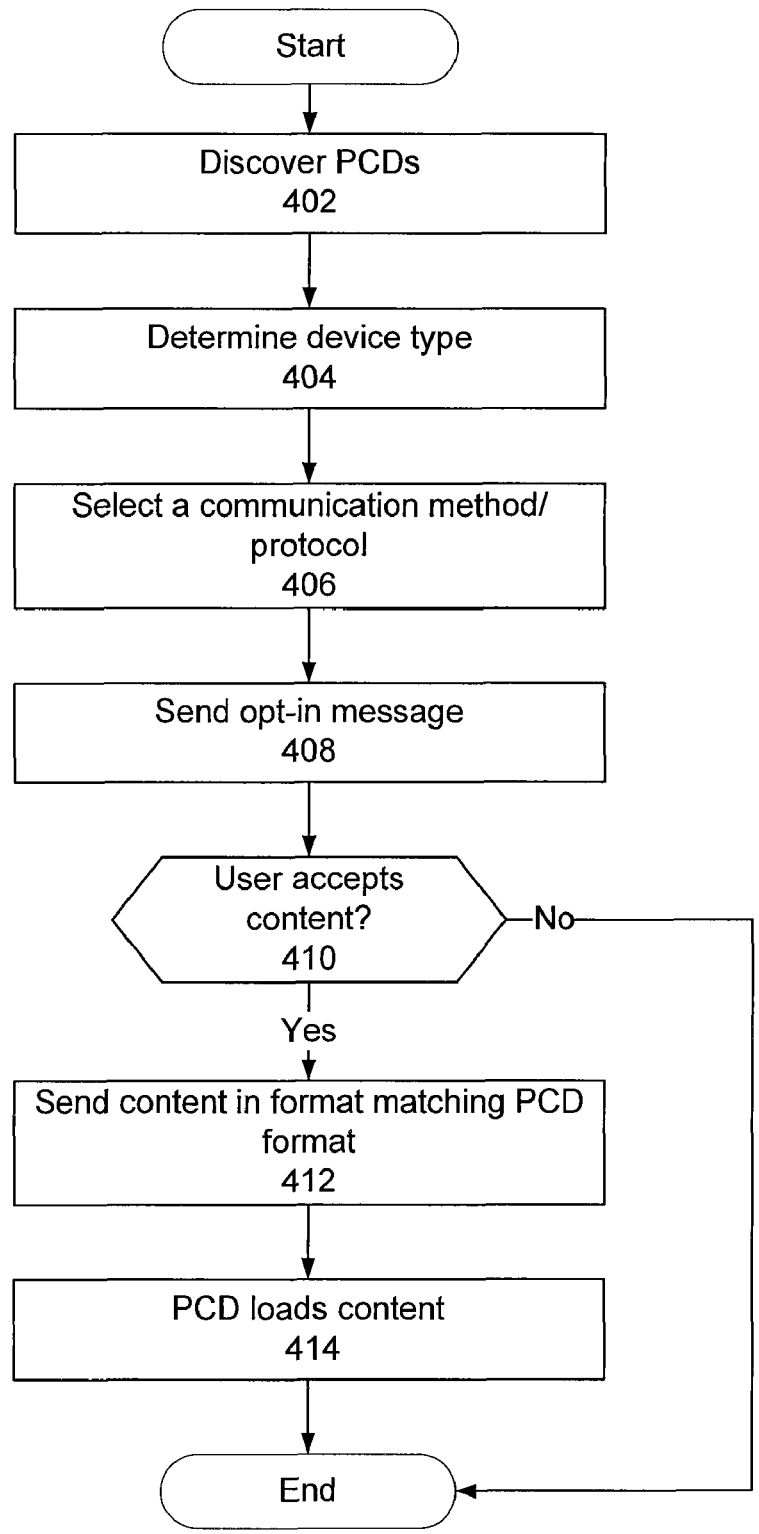
FIG. 4 is a flowchart of a first embodiment of a method for device-aware content delivery according to the present invention.

FIG. 4 is a flowchart of a first embodiment of a general method for device-aware content delivery according to the present invention. In particular, the method for device-aware content delivery of the present invention uses an algorithm and information obtained via wireless inquiries to infer the type of portable computing device 108 such that some programmatic action appropriate to the device can be taken. The method begins by discovering 402 at least one portable computing device 108. For example, the distributor 106 sends out a beacon signal. One or more portable computing devices 108 in the area will respond to the beacon. Next, the method determines 404 the device type of the discovered portable computing device 108. The device type of the portable computing device 108 is advantageously determined using a two-part interrogation process which combines empirical data with an exact confirmation of the device type. Examples of such processes for determining device type are described below with reference to FIGS. 6-8. Once the device type has been determined 404, the distributor 106 selects 406 a communication method or protocol supported by the device type. The distributor 106 then sends 408 an opt-in message to the portable computing device 108. The opt-in message presents the user with the option to accept or reject the content that the distributor 106 wants to send to the portable computing device 108. Then the method determines 410 whether the user has accepted to download the content. If the user chooses to reject the content from the distributor 106, the method is complete and ends. If the user chooses to accept the content from the distributor 106, the method continues and sends 412 the content in a format matching the portable computing device format. The method completes with the portable computing device 108 loading and/or executing 414 the content. The content can be any programmatic action specific to the remote device. For example, the content may be connecting to the device using an unpublished protocol, transmitting an application-specific to the devices operating system commercial machine, or simply alerting another program or process that portable computing device 108 is present.

Figure 5A:
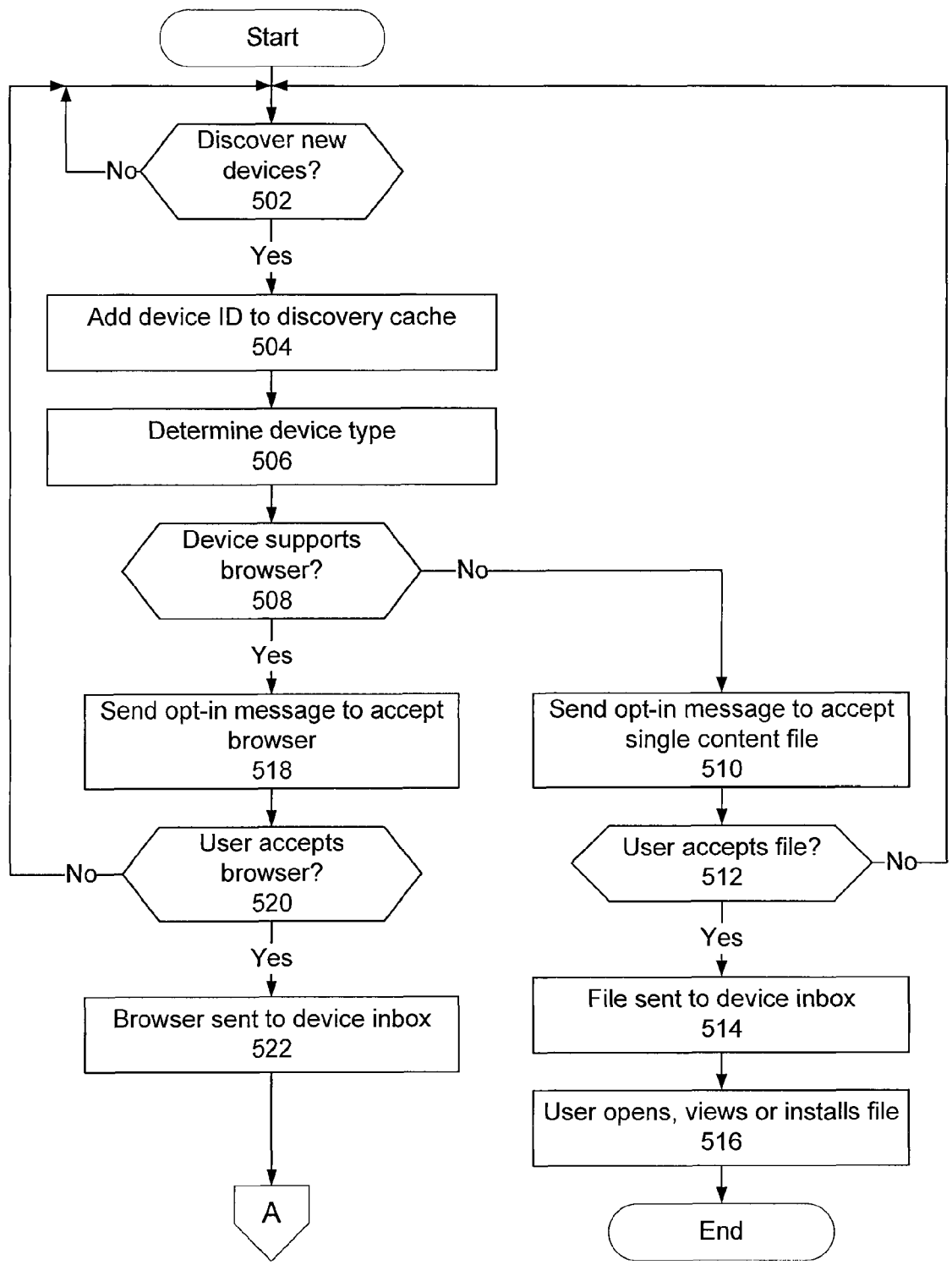
FIGS. 5A and 5B are a flowchart of a second embodiment of a method for device-aware content delivery according to the present invention.
Figure 5B:
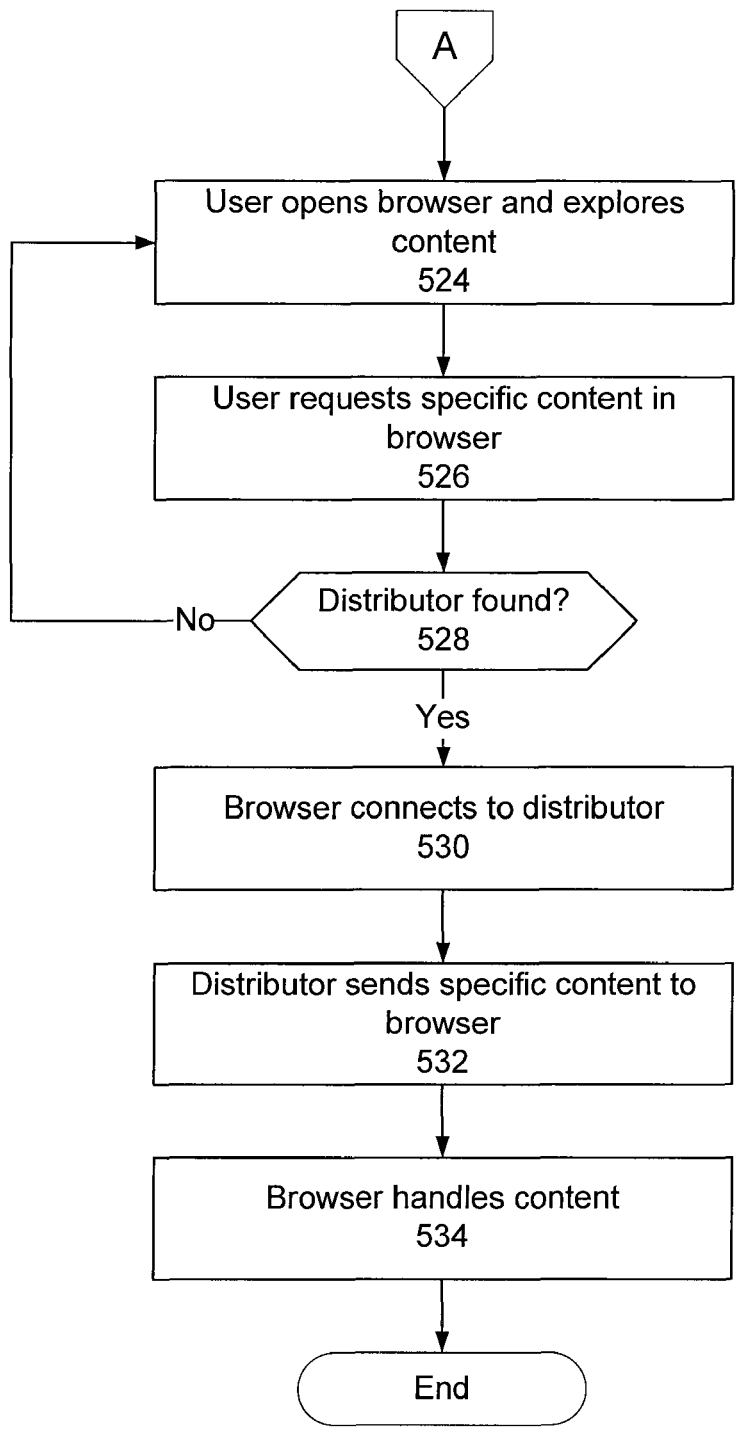

Referring now to FIGS. 5A and 5B, the second embodiment of the method for device-aware content delivery according to the present invention is described. Referring now to FIG. 5A, the process begins with the distributor 106 determining 502 whether any new devices 108 have been discovered. If not, the method loops through step 502 to repeatedly determine whether any new devices have been discovered. If a new device has been discovered, the method proceeds to step 504. In this step, the method adds the device ID to discovery cache. Then the method determines 506 the device type. Example embodiments for this step are described in more detail below with reference to FIGS. 6-8. Once the device type is known, the method determines 508 whether portable computing device 108 supports a browser. If the portable computing device 108 supports a browser, then the user can selectively choose which content to accept or reject. In contrast, if the browser is not supported, the portable computing device 108 is forced to accept the entire content file.

If the portable computing device 108 is determined not to support a browser, the method continues in step 510 by sending to the portable computing device 108 an opt-in message to accept a single content file from the distributor 106. The distributor 106 next determines 512 whether the user has accepted the file. If not, the method is complete and returns to step 502 to determine whether other devices 108 have been discovered. If the user has accepted the file, the method sends 514 the file to the inbox of the portable computing device 108. The delivery of the content is completed with the user opening, viewing and installing 516 the content file.

If in step 508 the portable computing device 108 is determined to support a browser, method continues in step 518 by sending an opt-in message to accept a browser installation file. The present invention advantageously uses a modified version of a browser that can be downloaded and is operable on the portable computing device 108. For example, different portable computing devices 108a-n may only be operational with different browser versions. In addition to the browser itself, information about content that is downloadable from the distributor 106, such as lists of available content, is also downloaded. This browser provides the user with improved interaction flexibility and options with regard to which content is downloaded from the distributor 106 and executed. Next method determines 520 whether the user has accepted the browser. If the user chooses not to accept the browser, the method returns to step 502 to discover additional portable computing devices 108. If the user accepted the browser, the distributor 106 sends 522 the browser to the inbox of the portable computing device 108. Referring now also to FIG. 5B, the method continues with the user opening 524 the browser and exploring 524 content. With the browser operating on the portable computing device 108, the user can request 526 specific content using the browser. It should be understood that the portable computing device 108 need not be connected for communication with the distributor 106 at all times. The use of the browser and additional information downloaded to the portable computing device 108 allows the user to select content that can be later downloaded when the portable computing device 108 is within range of the distributor 106. The method next determines 528 whether the distributor 106 providing the content can be found and is within communication range. If not, the method returns to step 524 in which the browser is presented on the portable computing device 108 and the user can explore and select other content. On the other hand, if the distributor 106 is found, the browser connects 530 to the distributor 106. Then the distributor 106 sends 532 specific content requested by the browser to the portable computing device 108. The browser then handles 534 the content at the portable computing device 108 by installing, viewing and/or executing it.

Figure 6:
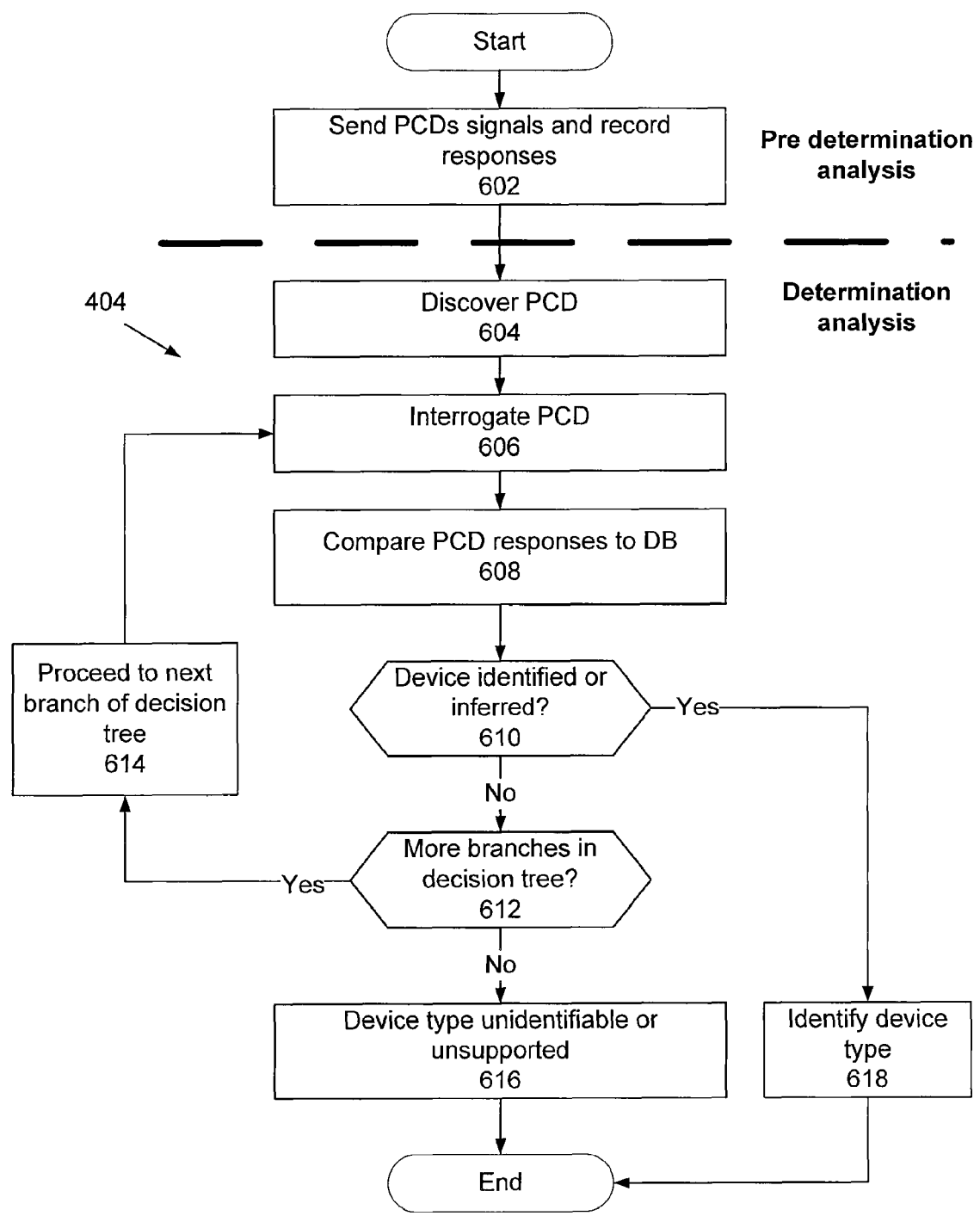
FIG. 6 is a flowchart of an embodiment of a general method for automatically determining a device type according to the present invention.

Referring now to FIG. 6, an embodiment of a general method for automatically determining a device type according to the present invention is described. The method begins with predetermination analysis 602 of portable computing devices 108. For example, the system 100 may send signals to different portable computing devices 108 and record their responses. The differences in the responses of different portable computing devices 108a-n allow the system 100 to differentiate and identify different types of portable computing devices 108. The system 100 may also maintain a database with information about different portable computing devices 108. For example, for each portable computing device 108 the database may include information such as device model number, device make, operating system, sub-operating system, manufacturer, supported features, screen size, bit depth and other functional characteristics of a particular portable computing device 108. Once the device type has been determined, this information can be used to enable communication with the distributor 106 and the portal computing device 108. A few example entries in the device database file that are used to compare new devices against to determine their type is shown below in Appendix B.

Still referring to FIG. 6, the method continues by discovering 604 a portable computing device 108. Once the specific portable computing device 108 has been discovered, the method interrogates 606 the portable computing device 108. The interrogation includes sending signals from the distributor 106 to the portable computing device 108, and receiving the responses. The method then compares 608 the responses provided by the portable computing device 108 to information stored in the database accessible by the distributor 106. This is the same database as described above with reference to step 602 that includes information used to identify a portable computing device 108 based on the responses provided by the portable computing device 108 to the interrogation signals sent by the distributor 106. Next method determines 610 whether the device 108 can be identified or inferred. The present invention preferably includes a decision tree. At each branch in the tree, the present invention differentiates a portable computing device 108 into a sub-branch of possible devices or device classes by comparing 608 the results of an interrogation of the device against a set of known replies. This set of known replies is determined empirically by the preexamination of devices supported by the present invention (see step 602). Each leaf node of the tree represents an identified portable computing device 108 or device class if unique device identification is not possible. If the portable computing device 108 can be identified, the process identifies 618 device type and the method is complete. If the device cannot be identified or inferred, the method determines 612 whether there are more additional branches on the decision tree. If there are additional branches on the decision tree, the method proceeds 614 to the next branch of the decision tree and then continues in step 606 by sending another interrogation signal to the portable computing device 108. Thus it can be seen that any number of branches in the decision tree can be traversed by sending additional interrogation signals to the portable computing device 108 and thereby specifically identifying the device type. If in step 612 the method determines that there are no more additional branches in the decision tree, the method proceeds to step 616 in which it signals that the device type is unidentifiable or unsupported.

Figure 7:
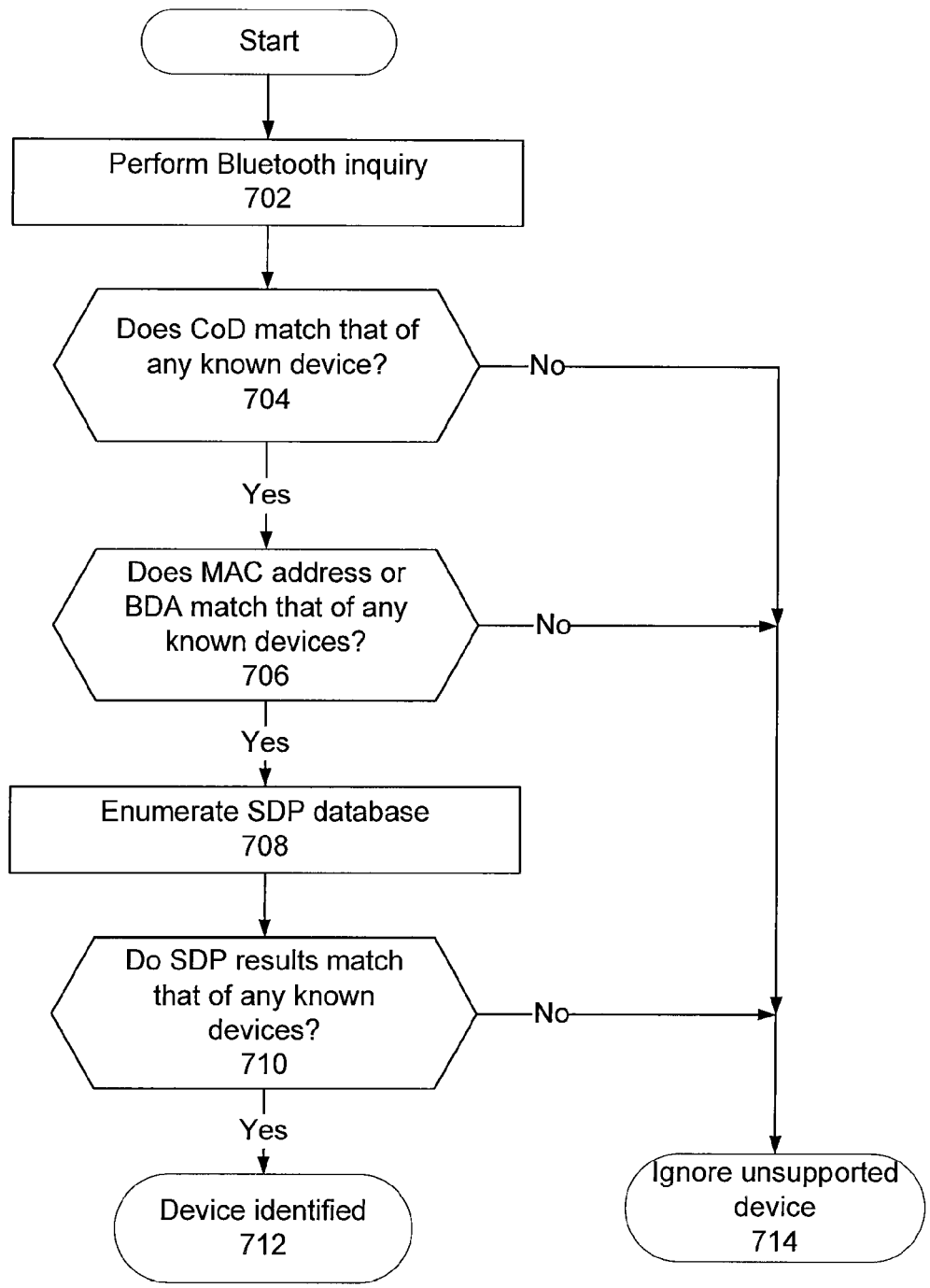
FIG. 7 is a flowchart of an embodiment of a method for automatically determining a device type using a Bluetooth® protocol according to the present invention.

Referring now to FIG. 7, an embodiment of the method for automatically determining a device type using a Bluetooth® protocol according to the present invention will be described. The method begins by performing 702 a Bluetooth® inquiry. For example, the distributor 106 uses a Bluetooth® API to retrieve information about the portable computing device 108. Using the Bluetooth® protocol, the distributor 106 issues an inquiry to the API of the portable computing device 108. The API of the portable computing device 108 returns a 32-bit value that specifies a CoD ("class of device") value and the MAC address (or Bluetooth® Device Address) of the Bluetooth® module in the portable computing device 108. The CoD value specified aspects of the portable computing device 108 such as whether it is a phone versus a computer versus a printer. The MAC address prefix uniquely indicates the manufacture of Bluetooth® module. Once the response to the inquiry has been received, the method determines 704 whether the CoD value matches that of any known portable computing device 108. In one embodiment this is done by comparing the CoD to a database or file of known devices or device types. If the CoD value does not match, the device is not supported or is not identifiable and the method completes in step 714. If the CoD value matches that of a known portable computing device 108, the method continues to determine 706 whether the MAC address or the BDA match that of any known devices. In one embodiment, this determination can be made by accessing a database or file addresses for known devices. If there is not an address match, the device is not supported or is not identifiable and the method completes in step 714. However, if the Mac address or the BDA matches a known device, the method proceeds to enumerate 708 the Service Discovery Profile (SDP) database. In step 708, the distributor 106 sends an SDP inquiry to the portable computing device 108. Each portable computing device 108 that is Bluetooth® compliant includes a Bluetooth® stack that maintains a public database of available services or "profiles." An inquiring device can ask another device for the profiles listed in its database. An exemplary response to an SDP query is shown below in Appendix A. The method uses the results from the SDP query to determine 710 whether they match that of any known devices. If they do, the method proceeds to step 712 and identifies the portable computing device 108 using the SDP results. If the SDP results do not match that of any known devices, the device is not supported or is not identifiable and the method completes in step 714.

Figure 8:
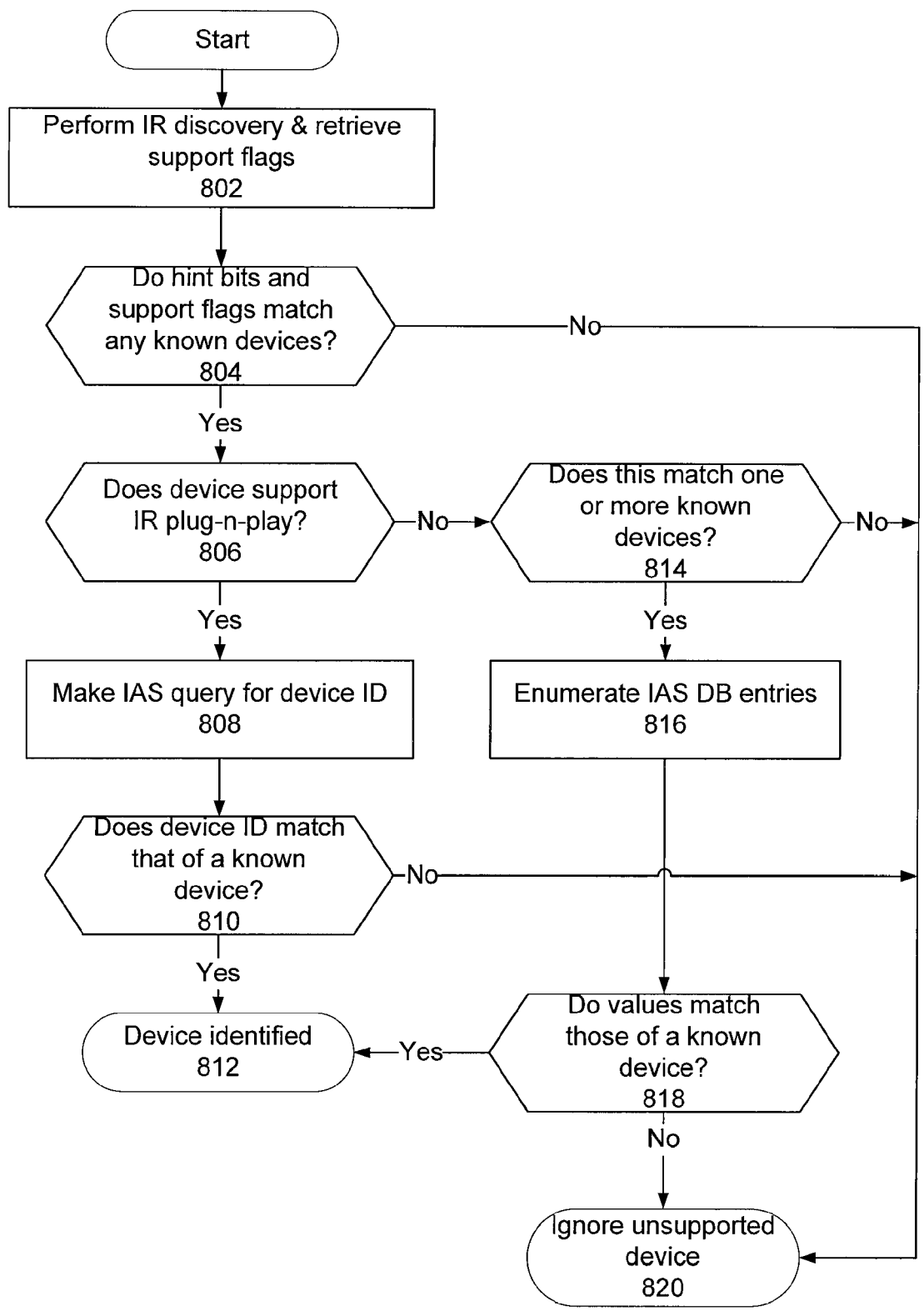
FIG. 8 is a flowchart of an embodiment of a method for automatically determining a device type using an infrared protocol according to the present invention.

Referring now to FIG. 8, a flowchart of an embodiment of the method for automatically determining a device type using an infrared (IR) protocol according to the present invention is described. The method begins by performing 802 IR discovery and retrieving support flags. The method uses the IrDA communication protocols to retrieve information about a portable computing device 108. The present invention uses the IrLAP (Infrared Link Access Protocol) to establish an IR communication channel between the distributor 106 and the portable computing device 108. The IrLAP specifies access control, discovery of potential communication partners, establishing of a reliable bidirectional connection and negotiation of the primary/secondary device roles. Using the IrLAP API, the distributor 106 can determine the human readable device name. In addition the API returns two 8-bit values of "hint bits." The hint bits themselves specify various features of the device, for example, whether the device is a PDA, a computer, or a printer, and whether it supports the OBEX protocol or not. One of the features is "Plug-n-Play" which, if present, guarantees that a known set of Information Access Service (IAS) entries can be queried for their values. In the discovery step 802, the IrLMP support flags are also retrieved from the portable computing device 108. The IrLMP (Infrared Link Management Protocol) support flags are three 8-bit values that indicate low-level link layer support over the IrDA protocol. The method first determines 804 whether any of the hint bits and support flags match any known portable computing devices 108. If not, the method proceeds to step 820 and ignores the device as an unsupported device. If the hint bits and support flags match a known portable computing device 108, the method determines 806 whether the portable computing device 108 supports IR plug-n-play. If the portable computing device 108 supports IR plug-n-play, the method makes 808 IAS queries for the device ID. For any given IR device that supports plug-n-play, an IrDA stack maintains a database of name/value pairs. An inquiring device can ask another device for the value of an IAS database entry. The method next determines 810 whether the device ID returned by the IAS query 808 matches that of a known device. If so, the device is identified in step 812 and the method is complete. If not, the method proceeds to step 820 and ignores the device as an unsupported device.

If it is determined in step 806 above that the portable computing device 108 does not support IR plug-n-play, the method proceeds to step 814. In step 814, the method tests whether the information from IR discovery matches one or more known devices. If not, the method proceeds to step 820 to ignore the device as an unsupported device. If the information does match one or more known devices, the method enumerates 816 IAS database entries that match. Then the method determines 818 whether any of the enumerated database entries match to those of a known portable computing device 108. If so, the device is identified in step 812 and the method is complete. If not, the method proceeds to step 820 and ignores the device as an unsupported device.

The foregoing description of the embodiments of the present invention has been presented for the purposes of illustration and description. It is not intended to be exhaustive or to limit the present invention to the precise form disclosed. Many modifications and variations are possible in light of the above teaching. It is intended that the scope of the present invention be limited not by this detailed description, but rather by the claims of this application. As will be understood by those familiar with the art, the present invention may be embodied in other specific forms without departing from the spirit or essential characteristics thereof. Likewise, the particular naming and division of the modules, routines, features, attributes, methodologies and other aspects are not mandatory or significant, and the mechanisms that implement the present invention or its features may have different names, divisions and/or formats. Furthermore, as will be apparent to one of ordinary skill in the relevant art, the modules, routines, features, attributes, methodologies and other aspects of the present invention can be implemented as software, hardware, firmware or any combination of the three. Of course, wherever a component, an example of which is a module, of the present invention is implemented as software, the component can be implemented as a standalone program, as part of a larger program, as a plurality of separate programs, as a statically or dynamically linked library, as a kernel loadable module, as a device driver, and/or in every and any other way known now or in the future to those of ordinary skill in the art of computer programming. Additionally, the present invention is in no way limited to implementation in any specific programming language, or for any specific operating system or environment. Accordingly, the disclosure of the present invention is intended to be illustrative, but not limiting, of the scope of the present invention, which is set forth in the following claims.

Appendix A

SDP query Example

Service Description: Sony Ericsson W800
Service RecHandle: 0x10000
Service Class ID List:
 "PnP Information" (0x1200)
Service Name: Dial-up Networking
Service RecHandle: 0x10001
Service Class ID List:
 "Dialup Networking" (0x1106)
 "Generic Networking" (0x1201)
Protocol Descriptor List:
 "L2CAP" (0x0100)
 "RFCOMM" (0x0003)
 Channel: 1
Profile Descriptor List:
 "Dialup Networking" (0x1106)
 Version: 0x100
Service Name: Serial Port
Service RecHandle: 0x10002
Service Class ID List:
 "Serial Port" (0x0101)
Protocol Descriptor List:
 "L2CAP" (0x0100)
 "RFCOMM" (0x0003)
 Channel: 2
Service Name: HF Voice Gateway
Service RecHandle: 0x10003
Service Class ID List:
 "Handfree Audio Gateway" (0x111f)
 "Generic Audio" (0x1203)
Protocol Descriptor List:
 "L2CAP" (0x0100)
 "RFCOMM" (0x0003)
 Channel: 3
Profile Descriptor List:
 "Handsfree" (0x111e)
 Version: 0x0101
Service Name: HS Voice Gateway
Service RecHandle: 0x10004
Service Class ID List:
 "Headset Audio Gateway" (0x1112)
 "Generic Audio" (0x1203)
Protocol Descriptor List:
 "L2CAP" (0x0100)
 "RFCOMM" (0x0003)
 Channel: 4
Profile Descriptor List:
 "Headset" (0x1108)
 Version: 0x0100
Service Name: OBEX Object Push
Service RecHandle: 0x10005
Service Class ID List:
 "OBEX Object Push" (0x1112)
Protocol Descriptor List:
 "L2CAP" (0x0100)
 "RFCOMM" (0x0003)
 Channel: 5
 "OBEX" (0x0008)
Profile Descriptor List:
 "OBEX Object Push" (0x1112)
 Version: 0x0100
Service Name: OBEX File Transfer
Service RecHandle: 0x10006
Service Class ID List:
 "OBEX File Transfer" (0x1106)
Protocol Descriptor List:
 "L2CAP" (0x0100)
 "RFCOMM" (0x0003)
 Channel: 6
 "OBEX" (0x0008)
Profile Descriptor List:
 "OBEX File Transfer" (0x1106)
 Version: 0x0100
Service Name: OBEX SyncML Client
Service RecHandle: 0x10007
Service Class ID List:
 "Error: This is UUID-128" (0x00000002-0000-1000-8000-0002ee000002)
Protocol Descriptor List:
 "L2CAP" (0x0100)
 "RFCOMM" (0x0003)
 Channel: 7
 "OBEX" (0x0008)
Service Name: OBEX IrMC Sync Server
Service RecHandle: 0x10008
Service Class ID List:
 "IrMC Sync" (0x1104)
Protocol Descriptor List:
 "L2CAP" (0x0100)
 "RFCOMM" (0x0003)
 Channel: 8
 "OBEX" (0x0008)
Profile Descriptor List:
 "IrMC Sync" (0x1104)
 Version: 0x0100
Service Name: Mouse & Keyboard
Service Description: Remote Control
Service Provider: Sony Ericsson
Service RecHandle: 0x10009
Service Class ID List:
 "Human Interface Device" (0x1124)

Protocol Descriptor List:
    "L2CAP" (0x0100)
    PSM: 17
    "HIDP" (0x0011)
Language Base Attr List:
    code_ISO639: 0x656
    encoding: 0x6a
    base_offset: 0x100
Profile Descriptor List:
    "Human Interface Device" (0x1124)
    Version: 0x0100

Appendix B

Sample Devide Detection Database Entries (With Description of Fields)

```
# Fields:
# description: Test description (required)
# cod: CoD of device (optional, default = 0)
# cod_mask: Mask for CoD match (optional, default ignore CoD)
# media_id: WRSP Media ID. −1 = not supported. (optional, default = −1)
# protocol: OBEX protocol, either opp or ftp. (optional, default = opp)
# role_switch: Y to enable role switches, N to disable (optional, default = Y)
# requery_sdp: Y to requery the SDP server if it claims no obex support, N to trust the sdp server.
#               This is for Palms. (optional, default = N)
# refuse_spp: Y to refuse a connection to the proxy, N to allow it. (optional, default = N)
# obex_mtu: MTU to use for OBEX transfers. (optional, default = use default MTU).
# bd_addr: BD_ADDR to match. (optional, default = 00:00:00:00:00:00)
# bd_addr_mask: BD_ADDR mask for match. (optional, default = 00:00:00:00:00:00 (don't care))
# If media_id = −1 and refuse_spp=y, then a connection from that device is closed immediately.
[dev.palm_Treo650]
description = "Palm Treo650"
cod = 0x50020c
cod_mask = 0xffffff
media_id = 0x20
protocol = opp
role_switch = y
requery_sdp = y
# OUI 00:07:E0 = Palm Inc
bd_addr      = 00:07:e0:00:00:00
bd_addr_mask = ff:ff:ff:00:00:00
[dev.nokia6630_6680_6260]
description = "Nokia6630_6680_6260"
cod = 0x50020c
cod_mask = 0xffffff
media_id = 0x22
protocol = opp
role_switch = y
bd_addr      = 00:12:62:00:00:00
bd_addr_mask = ff:ff:ff:00:00:00
obex_mtu = 4059
[dev_motorola_RazrV3v1_V551_V600_V635]
description = "Motorola RazrV3v1_V551_V600_V635"
cod =0x522204
cod_mask =0xffffff
media_id = 0x27
bd_addr      = 00:12:8A:C9:76:30
bd_addr_mask = ff:ff:ff:00:00:00
protocol = opp
role_switch = y
obex_mtu = 4059
More entries . . .
```

What is claimed is:

1. An apparatus for device-aware content delivery, the apparatus comprising:
    a transceiver system adapted for communication with a portable computing device having a device type defined by a plurality of functional characteristics specific to the portable computing device;
    a data repository storing information for a plurality of portable computing devices, for each portable computing device the information including the device type and known replies to interrogation signals, the known replies specifying at least one functional characteristic specific to the corresponding portable computing device; and
    a module for intelligent delivery of content coupled to the transceiver system for communication with the portable computing device and to the data repository, the module adapted to determine the device type of the portable computing device by:
        sending a first interrogation signal to the portable computing device,
        receiving a first response signal to the first interrogation signal from the portable computing device, the first response signal including at least one of the plurality of functional characteristics specific to the portable computing device,
        sending a second interrogation signal to the portable computing device,
        receiving a second response signal to the second interrogation signal from the portable computing device, the second response signal including at least one of the plurality of function characteristics of the portable computing device,
        empirically determining the device type of the portable computing device by comparing the first response signal and the second response signal to the known replies in the data repository and by determining whether there are additional branches in a decision tree, each branch of the decision tree differentiating a portable computing device into a sub-branch of possible devices or device classes and if there are additional branches in a decision tree, proceeding to a next branch in the decision tree and performing the step of sending, receiving and comparing for the next branch, and
        sending the portable computing device content specific to the device type of the portable computing device.

2. The apparatus of claim 1, wherein the data repository stores a plurality of identity profiles for different portable computing devices, each identity profile including a response to an interrogation signal specific to a type of portable computing device, and an indication of capabilities of a particular portable computing device.

3. The apparatus of claim 1, wherein the content is programmatic action specific to the portable computing device.

4. The apparatus of claim 3, wherein the programmatic action is: connecting to the portable computing device using a protocol, transmitting an application specific to an operating system of the portable computing device, or alerting another program or process that the portable computing device is present.

5. The apparatus of claim 1, wherein the apparatus includes a processor and the module is software operational on the processor.

6. The apparatus of claim 1, further comprising a network receiver adapted for communication with an information system, the network receiver sending and receiving messages from the information system including the content.

7. The apparatus of claim 1, wherein the information stored in the data repository includes a device model number, a device make, an operating system, a sub-operating system, a manufacturer, supported features, screen size, bit depth, a reference to a server location storing such device-specific information or another functional characteristic of a particular portable computing device.

8. The apparatus of claim 1, wherein the identity of the portable computing device includes an operating system and a screen size.

9. A method for device-aware content delivery, the method comprising:
discovering a portable computing device having a device type defined by a plurality of functional characteristics specific to the portable computing device;
sending the portable computing device a first interrogation signal;
receiving a first response signal to the first interrogation signal from the portable computing device, the first response signal including at least one of the plurality of functional characteristics specific to the portable computing device;
sending the portable computing device a second interrogation signal;
receiving a second response signal to the second interrogation signal from the portable computing device, the second response signal including at least one of the plurality of function characteristics of the portable computing device;
empirically determining the device type of the portable computing device by comparing the first response signal and the second response signal against a set of known replies for different portable computing devices for a match, the known replies each specifying at least one functional characteristic specific to the corresponding portable computing device;
determining whether there are additional branches in a decision tree, each branch of the decision tree differentiating a portable computing device into a sub-branch of possible devices or device classes;
if there are additional branches in a decision tree, proceeding to a next branch in the decision tree and performing the step of sending, receiving and comparing for the next branch; and
identifying the device type of the portable computing device corresponding to the match and the decision tree.

10. The method of claim 9, further comprising:
sending an opt-in message to the portable computing device;
receiving a signal from the portable computing device accepting the content; and
responsive to the signal accepting the content being received, sending content in a format matching a format for the device type of the portable computing device.

11. The method of claim 9 further comprising installing the content on the portable computing device.

12. The method of claim 9 wherein the content is programmatic action specific to the portable computing device.

13. The method of claim 12 wherein the programmatic action is: connecting to the portable computing device using a protocol, transmitting an application specific to the operating system of the portable computing device, or alerting another program or process that the portable computing device is present.

14. The method of claim 9 further comprising:
determining whether the portable computing device supports application installation;
if the portable computing device supports application installation, sending a browser application to the portable computing device;
providing information about available content via the browser; and
selecting the content using the browser.

15. The method of claim 14 further comprising:
sending specific content to the browser; and
installing the specific content on the portable computing device using the browser.

16. A method for determining a device type for a portable computing device, the method comprising:
sending a first interrogation signal to the portable computing device having a device type defined by a plurality of functional characteristics specific to the portable computing device;
receiving a first response signal from the portable computing device to the first interrogation signal, the received first response signal including at least one of the plurality of functional characteristics specific to the portable computing device;
sending a second interrogation signal to the portable computing device;
receiving a second response signal from the portable computing device to the second interrogation signal, the second response signal including at least one of the plurality of function characteristics of the portable computing;
comparing the first response signal and the second response signal against a set of known replies for different portable computing devices for a match, the known replies specifying at least one functional characteristic specific to the corresponding portable computing device;
determining whether there are additional branches in a decision tree, each branch of the decision tree differentiating a portable computing device into a sub-branch of possible devices or device classes;
if there are additional branches in a decision tree, proceeding to a next branch in the decision tree and performing the step of sending, receiving and comparing for the next branch; and
identifying the device type of the portable computing device empirically based on the match and the decision tree.

17. The method of claim 16, further comprising discovering the portable computing device.

18. The method of claim 16, wherein the comparing includes accessing a database of information about different portable computing devices with a distributor.

19. The method of claim 16, wherein the steps of sending and receiving uses a Bluetooth® protocol, and wherein the step of comparing determines whether a class of device matches that of any known portable computing device, and whether an address matches that of any known portable computing device.

20. The method of claim 19, further comprising:
enumerating a service discovery profile; and
determining whether the service discovery profile matches that of any known portable computing device.

21. The method of claim 16, wherein the steps of sending and receiving use an infrared protocol, and wherein the step of comparing determines whether hint bits and support flags match that of any known portable computing device.

22. The method of claim 21, further comprising making an information access service query for a device identification and determining whether the device identification matches that of any known portable computing device.

23. The method of claim 21, further comprising enumerating information access service database entries and determining whether retuned values match that of any known portable computing device.

* * * * *